(12) United States Patent
Brun et al.

(10) Patent No.: US 11,028,811 B2
(45) Date of Patent: Jun. 8, 2021

(54) INTERNAL COMBUSTION ENGINE INCLUDING AT LEAST ONE ELECTRIC MOTOR

(71) Applicant: DEUTZ Aktiengesellschaft, Cologne (DE)

(72) Inventors: Marco Brun, Langenfeld (DE); Wilhelm Feuser, Bornheim (DE); Anton Kleinschmidt, Bruehl (DE); Gerhard Knaps, Troisdorf (DE); Joachim Joisten-Pieritz, Kall-Steinfeld (DE); Peter Hoffmann, Cologne (DE); Marco Jung, Cologne (DE); Paul Schwabauer, Montabaur (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 15/571,968

(22) PCT Filed: May 4, 2016

(86) PCT No.: PCT/EP2016/000732
§ 371 (c)(1),
(2) Date: Nov. 6, 2017

(87) PCT Pub. No.: WO2016/184545
PCT Pub. Date: Nov. 24, 2016

(65) Prior Publication Data
US 2018/0128230 A1 May 10, 2018

(30) Foreign Application Priority Data
May 20, 2015 (DE) .......................... 102015006365.0

(51) Int. Cl.
*F02N 11/00* (2006.01)
*F02N 11/04* (2006.01)
(Continued)

(52) U.S. Cl.
CPC ................ *F02N 11/04* (2013.01); *B60K 6/26* (2013.01); *B60K 6/40* (2013.01); *B60K 6/48* (2013.01);
(Continued)

(58) Field of Classification Search
CPC ... B60W 20/00; B60W 10/08; Y02T 10/6226; F02N 11/04; F02N 11/006; F02D 2400/21
(Continued)

(56) References Cited

U.S. PATENT DOCUMENTS 5,163,335 A * 11/1992 Isom ...................... F02N 15/006
123/195 A
5,533,485 A * 7/1996 Bronkal .................. F02F 7/006
123/456
(Continued)

FOREIGN PATENT DOCUMENTS

CN 101342860 1/2009
CN 102865173 1/2013
(Continued)

*Primary Examiner* — Logan M Kraft
*Assistant Examiner* — James J Kim
(74) *Attorney, Agent, or Firm* — Davidson, Davidson & Kappel, LLC

(57) ABSTRACT

An internal combustion engine, including at least one electric motor (8, 13, 16, 20) situated on the crankcase of the internal combustion engine, at least one control unit (1) for controlling the internal combustion engine and/or the electric motor and at least one high voltage converter (15).

20 Claims, 4 Drawing Sheets

Service Side

(51) Int. Cl.

| | | |
|---|---|---|
| *B60K 25/02* | (2006.01) | |
| *F02N 15/00* | (2006.01) | |
| *F02M 63/02* | (2006.01) | |
| *F02M 39/02* | (2006.01) | |
| *F01P 11/08* | (2006.01) | |
| *F02M 39/00* | (2006.01) | |
| *B60K 6/40* | (2007.10) | |
| *B60K 6/48* | (2007.10) | |
| *B60K 6/26* | (2007.10) | |
| *F02D 45/00* | (2006.01) | |
| *F02N 11/08* | (2006.01) | |

(52) U.S. Cl.
CPC .............. *B60K 25/02* (2013.01); *F01P 11/08* (2013.01); *F02D 45/00* (2013.01); *F02M 39/00* (2013.01); *F02M 39/02* (2013.01); *F02M 63/0275* (2013.01); *F02N 15/006* (2013.01); *B60K 2006/268* (2013.01); *B60Y 2200/92* (2013.01); *F02D 2400/21* (2013.01); *F02N 2011/0896* (2013.01)

(58) Field of Classification Search
USPC ........ 123/179.25, 143 C, 195 C, 456; 701/22
See application file for complete search history.

(56) References Cited

U.S. PATENT DOCUMENTS

| | | | |
|---|---|---|---|
| 5,771,850 A * | 6/1998 | Okada | F02F 7/006 123/143 C |
| 6,460,642 B1 | 10/2002 | Hirano | |
| 7,089,890 B2 * | 8/2006 | Obidi | F01P 3/02 123/41.31 |
| 7,516,737 B2 | 4/2009 | Cerabone et al. | |
| 7,625,257 B1 * | 12/2009 | Broman | B63H 20/26 440/89 B |
| 8,020,656 B2 | 9/2011 | Inoue | |
| 8,689,757 B2 | 4/2014 | Lee et al. | |
| 8,965,668 B2 | 2/2015 | Debelak et al. | |
| 2002/0139344 A1 * | 10/2002 | Kitada | F02F 7/006 123/195 C |
| 2004/0021377 A1 * | 2/2004 | Mazuka | F02B 63/04 310/59 |
| 2004/0060752 A1 | 4/2004 | Oshida et al. | |
| 2005/0014583 A1 * | 1/2005 | Morii | F01M 1/06 474/14 |
| 2005/0205066 A1 | 9/2005 | Maegoya et al. | |
| 2006/0065453 A1 | 3/2006 | Morrow et al. | |
| 2006/0196451 A1 * | 9/2006 | Braun | F01P 7/167 123/41.1 |
| 2008/0173170 A1 * | 7/2008 | Zauner | F02F 7/0068 92/261 |
| 2008/0210193 A1 * | 9/2008 | Neu | F02F 7/0046 123/196 CP |
| 2008/0314687 A1 * | 12/2008 | Shiozaki | B62M 7/02 184/6.5 |
| 2009/0159049 A1 * | 6/2009 | Sakagami | F02M 55/02 123/456 |
| 2009/0242307 A1 * | 10/2009 | Miyabe | B60T 7/042 180/230 |
| 2009/0293670 A1 * | 12/2009 | Sekira | F02N 15/006 74/7 E |
| 2010/0050976 A1 * | 3/2010 | Taki | F02F 7/0058 123/195 C |
| 2010/0283242 A1 * | 11/2010 | Dooley | F02N 11/0862 290/31 |
| 2011/0209680 A1 * | 9/2011 | Katayama | F02B 67/06 123/192.2 |
| 2012/0160208 A1 * | 6/2012 | Takano | F01M 1/10 123/196 A |
| 2012/0216770 A1 | 8/2012 | Brun | |
| 2012/0302397 A1 * | 11/2012 | Habbani | B60W 20/13 477/5 |
| 2013/0037372 A1 * | 2/2013 | Fukaya | F16D 48/0206 192/85.63 |
| 2013/0099088 A1 * | 4/2013 | Takahashi | F02B 63/04 248/639 |
| 2013/0239917 A1 * | 9/2013 | Nishikiori | F02D 13/0253 123/90.1 |
| 2013/0270862 A1 | 10/2013 | Hotta et al. | |
| 2014/0083789 A1 * | 3/2014 | Yokota | B62K 11/04 180/291 |
| 2014/0090620 A1 * | 4/2014 | Buck | F02F 7/0031 123/193.5 |
| 2014/0202407 A1 * | 7/2014 | Miyamoto | F01L 1/3442 123/90.15 |
| 2014/0340095 A1 * | 11/2014 | Schneider | B60W 20/50 324/511 |
| 2014/0345548 A1 * | 11/2014 | Miura | F01P 3/12 123/41.08 |
| 2014/0373676 A1 * | 12/2014 | Nefcy | F02N 15/022 74/7 C |
| 2015/0101576 A1 * | 4/2015 | Shiraishi | B62J 37/00 123/509 |
| 2016/0115859 A1 * | 4/2016 | Tanada | F02B 39/16 123/565 |
| 2016/0290304 A1 * | 10/2016 | Yukawa | B60L 58/20 |

FOREIGN PATENT DOCUMENTS

| | | |
|---|---|---|
| DE | 9410232 U1 | 11/1995 |
| DE | 19750298 A1 | 5/1999 |
| DE | 10214635 A1 | 10/2002 |
| DE | 10303102 A1 | 7/2004 |
| DE | 102005031300 A1 | 1/2007 |
| DE | 102007053493 A1 | 5/2009 |
| DE | 102011100188 | 6/2012 |
| DE | 10 2011 012 095 A1 | 8/2012 |
| DE | 102013020440 | 7/2014 |
| EP | 1512591 | 3/2005 |
| EP | 2 979 945 A1 | 2/2016 |
| GB | 2463652 | 3/2010 |
| JP | H0821340 | 1/1996 |
| JP | H1044789 | 2/1998 |
| JP | 2002364506 | 12/2002 |
| JP | 2008116018 | 5/2008 |
| JP | 2010018057 A | 1/2010 |
| WO | WO2011072836 | 6/2011 |

* cited by examiner

Fig. 1 Service Side

*Fig. 2* .Exhaust Gas Side

INTERNAL COMBUSTION ENGINE INCLUDING AT LEAST ONE ELECTRIC MOTOR

The present invention relates to an internal combustion engine, which includes at least one electric motor.

BACKGROUND

In previous hybrid concepts, the components (electric machines) were usually designed for accommodation on the transmission side. The engine architecture of today's internal combustion engines is largely determined by the classic arrangement of system components, whose existing interfaces are not extensively conceptually prepared for future technologies, such as seamless hybridization. This fact presents an enormous technical and economic challenge to any subsequent hybrid application.

As customer requirements and applications continue to grow with respect to the variety of hybrid systems, it will become more and more difficult to meet these challenges with justifiable complexity

SUMMARY OF THE INVENTION

It is an object of the present invention to integrate these components into the internal combustion engine in such a way that the large number of possible customer applications can be covered with or without special transmission variants, and the customer spectrum can be expanded for the future.

The object is achieved by an internal combustion engine, which includes at least one electric motor situated on the crankcase of the internal combustion engine, at least one control unit for controlling the internal combustion engine and/or the electric motor and at least one high-voltage converter. One advantageous embodiment provides that at least one electric motor is designed as a starter.

Another advantageous embodiment provides that at least one electric motor is designed as a generator. It is advantageous that excess energy generated may be stored, for example, in batteries.

Another advantageous embodiment provides that the common rail is situated in the cylinder head cover. This has installation space and mounting advantages.

One advantageous embodiment provides that the cable harness is situated in the cylinder head cover. This also has installation space and mounting advantages.

Another advantageous embodiment provides that the control unit is situated on or at the cylinder head cover. This also has installation space and mounting advantages.

Another advantageous embodiment provides that the control unit is connectable to the cable harness integrated into the cylinder head cover essentially without cables. This also has installation space, mounting, and servicing advantages.

One advantageous embodiment provides that the engine oil cooler is situated on the side of the crankcase approximately at the height of and spatially behind an electric motor, in particular on the exhaust gas side. This has installation space, mounting, and servicing advantages.

Another advantageous embodiment provides that the exhaust gas recirculation (EGR) module is situated on the side of the crankcase, essentially above the engine oil cooler, in particular on the exhaust gas side. This has installation space, mounting, and servicing advantages.

Another advantageous embodiment provides that the high-pressure pump is situated essentially on the cylinder head, in particular on the service side, in such a way that it is connectable to the common rail situated in the cylinder head cover essentially without cables. This has installation space, mounting, and servicing advantages.

Another advantageous embodiment provides that at least one hydraulic pump is situated below the electric motor situated on the side of the crankcase and, like the electric motor, is situated on the frontal gear train via a gear drive. This has installation space, mounting, and service advantages and increases the application possibilities.

Other advantages of the present invention are a reinforced crankcase having a defined force connection. The function of the front cover is integrated into the crankcase. A reinforced power train and gear train include a special bearing (the crankcase has an enlarged bearing in the direction of the flywheel and toward the edge); the design of the engine is conceived for block assembly as the supporting unit for the forward, backward and sideways connection; (together with a cast oil pan, the engine becomes the supporting component).

Connection options are available for various hybrid systems for the industrial sector; internal combustion engine designs having different numbers of cylinders, e.g., compatible with 4 and 6 cylinders (the outer geometry of the torsional vibration damper has a separation of functions); adaptation in the coolant and oil circuit, optimized with respect to pressure loss; multifunctional adapter transmission for a high-speed electric machine and power takeoff (PTO), including clutch and cableless oil supply via plug connections; belt-free engine and continuously electrified ancillary units as options; consistent separation of functions and distribution of the system components according to strict safety criteria and service requirements for the best possible customer benefit.

In one preferred embodiment, it is provided that the high-pressure pump is surrounded by a noise protection, step protection or impact protection cage.

BRIEF DESCRIPTION OF THE DRAWINGS

The present invention is explained in greater detail below on the basis of one exemplary embodiment.

DETAILED DESCRIPTION

Figure 1:
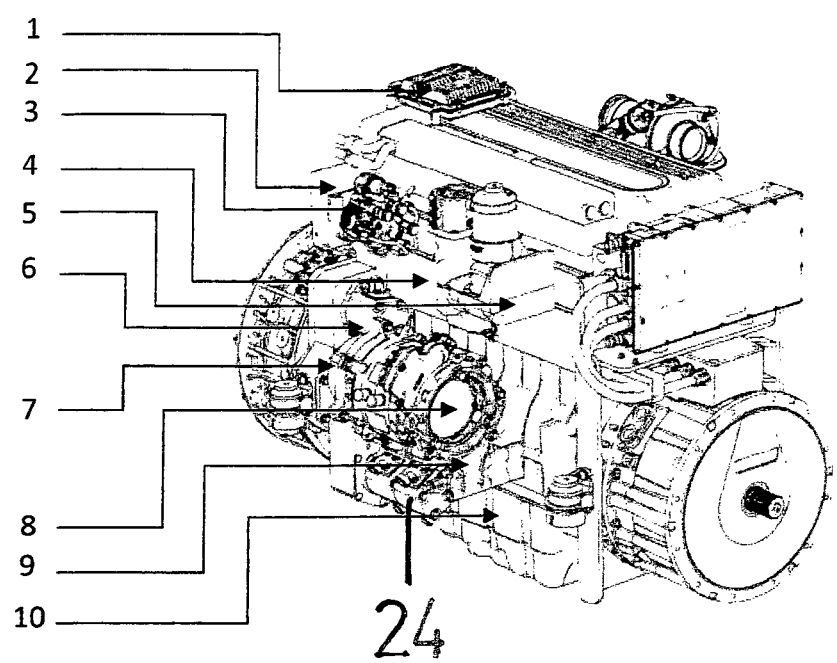
FIG. 1 shows the service side of the internal combustion engine.
Figure 2:
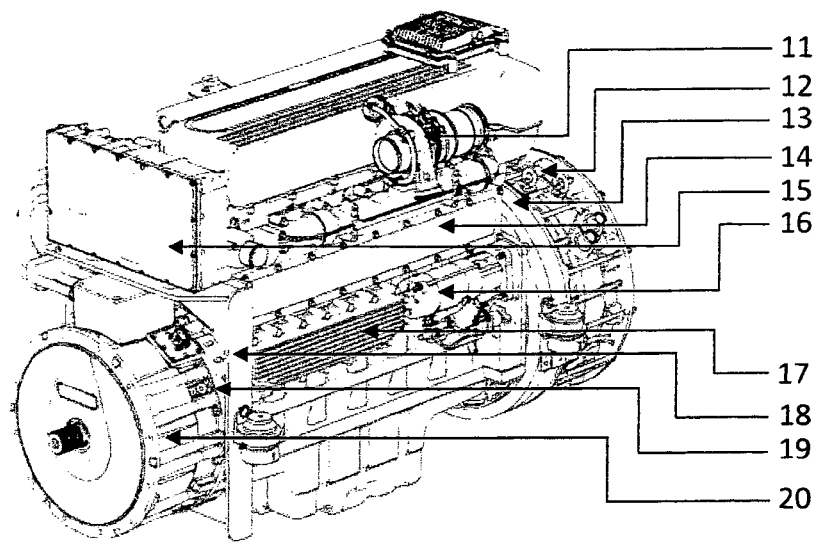

The basic idea is that the entire system is to be modified with respect to the assembly arrangement and layout of the components in such a way that the complexity of the basic engine in the design decreases and may simultaneously be utilized for the purpose of easier integration due to the degrees of freedom obtained and new reinforced interfaces. Three installation space areas may thus be generally illustrated for accommodating the particular hybrid systems (cf., for example, FIG. 3):

(A) Area for flywheel & SAE
(B) Area for service side & PTO
(C) Area for fan & belt drive The present invention relates to the entire coordinated and intermeshing arrangement of the system components. In this advantageous specific embodiment, including a clear separation of functions, all key assemblies are segmented and recombined in such a way that a very high functional density may be achieved, making optimum and compact use of the installation space. An overhead control unit 1 is illustrated in FIGS. 1 and 2, including a direct cable channel, which is situated either in parallel to the cylinder head cover or within the cylinder head cover. There is a cable channel variant with or without dust and water protection. Cylinder head 2 is provided with a cross-flow design and includes common rail injectors 25 having high-pressure lines and dust-protected sheathing of various components of the injection system. Moreover, cylinder head 2 includes sensors, interfaces and connecting points for exhaust gas aftertreatment (EGA system). The customer tubing connection (CTC) includes an optional overhead fan bearing, engine step protection and an engine transport holder as well as an overhead high-pressure pump 3, which is/are connected directly on the cylinder head with our without acoustic protection. Crankcase 4 is designed with or without the function of splitting the coolant circuit, the so-called split cooling system. The closed oil pan contour without interruption of the seal results in a reinforced engine and a reinforced gear train. The EGR recirculation system is situated on the exhaust gas side of the internal combustion engine. Interfaces exist for attachment components and the engine mounting system. Filter module 5 for fuel and oil is detached from the oil cooling function. Power takeoff (PTO) module (B) 6 is mounted directly on crankcase 4. Adapter transmission 7 is, for example, a spur gear unit for faster transmission—with or without an elastic clutch. The internal combustion engine includes a dust-protected receptacle for the electric machine (high speed system). The internal combustion engine may be designed with or without a PTO (A) interface. The internal combustion engine furthermore includes a direct cableless oil supply via plug-in elements. Electric machine 8 (high-speed system) is provided with a dust-protected design for the heavy-duty area. Supporting bracket 9, including tolerance compensation, is connected directly to the crankcase. Oil pan 10 is optimized with respect to acoustic performance and designed as a sheet-metal, cast or plastic part. The exhaust gas line and exhaust gas turbocharger 11 may be implemented in various attachment positions. EGR module system 14 may be implemented with or without an integrated positioning unit and be fully integrated into the crankcase; it is connected directly and flow-optimized to the cooling circuit system, excluding a holding bracket and excluding coolant lines, and to the exhaust gas recirculation system in the crankcase, which is scalable in the range of functions, depending on the emissions level. Electric machine 12 (mild hybrid system) is provided with a dust-protected design for the heavy-duty area. Adapter unit 13 (SAE area) for direct connection of the electric machine is situated in a centered manner on the crankcase. High-voltage converter 15 is attached, softly mounted on the front plate. Starter 16 may be designed with or without dust protection or with or without water protection. Engine oil cooler 17 is fully integrated into the crankcase and connected directly and flow-optimized to the cooling circuit system. Front plate 18 is directly connected and situated in a centered manner on the crankcase. Adapter unit 19 is situated in a centered manner on the crankcase in the area of the fan & belt drive for direct connection of electric machine 20. In the design for the heavy duty area, electric machine 20 and adapter unit 19 are situated in a dust-protected manner.

Figure 4:
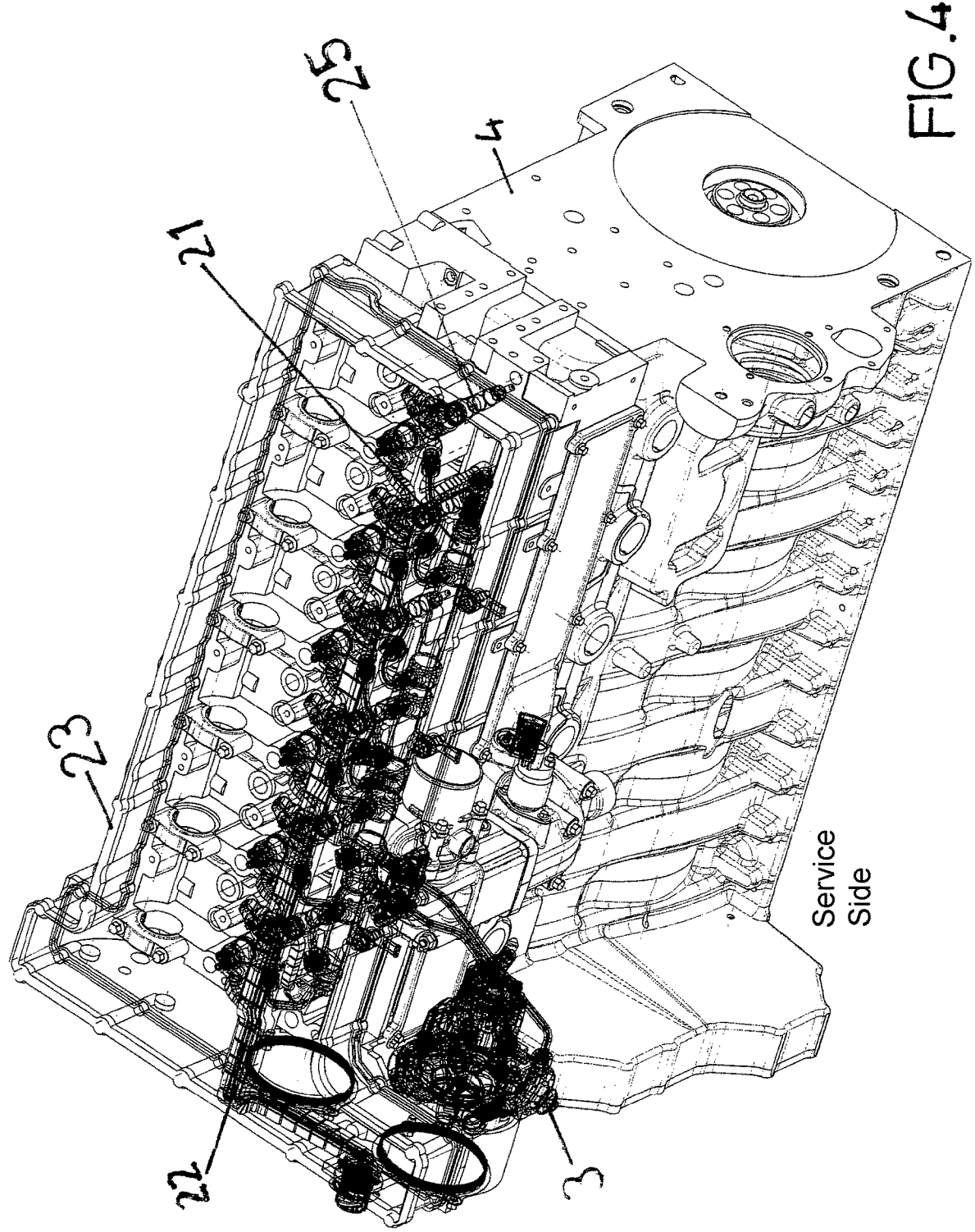
FIG. 4 shows a top view of the cylinder head.

FIG. 1 shows control unit 1 on cylinder head cover 23 (FIG. 4), which is connected to cable harness channel 22 (FIG. 4) situated in parallel to cylinder head cover 23 (FIG. 4). On cylinder head 2, diesel high-pressure pump 3 is connected essentially without cables to common rail 21, which is not visible and is shown in FIG. 4. Filter module 5 is situated on crankcase 4 on the service side. So-called power takeoff (PTO) 6 is situated above adapter transmission 7 below diesel high pressure pump 3 on the service side. Electric motor 8 is situated on adapter transmission 7, adapter transmission 7 being situated on the frontal gear train. Supporting bracket 9 supports electric motor 8 and abuts hydraulic pump 24. Oil pan 10 is situated below crankcase 4.

FIG. 2 shows the engine from FIG. 1 from its exhaust gas side; the exhaust gas line and exhaust gas turbocharger (EGT) 11 are situated at approximately the height of cylinder head cover 23 or cylinder head 2. Electric motor 12 is situated on a front face of the internal combustion engine with the aid of an SAE adapter unit 13. EGR module 14 is situated below the exhaust gas line and exhaust gas turbocharger (EGT) 11 and above electric motor/starter 16, and engine oil cooler 17 at approximately the height of cylinder head 2. High voltage converter 15 is situated on the other front face of the internal combustion engine, above adapter unit 19 and electric motor 20 and connected by a cable to electric motor 20. A front plate 18 is situated on the other front face of the crankcase.

Figure 3:
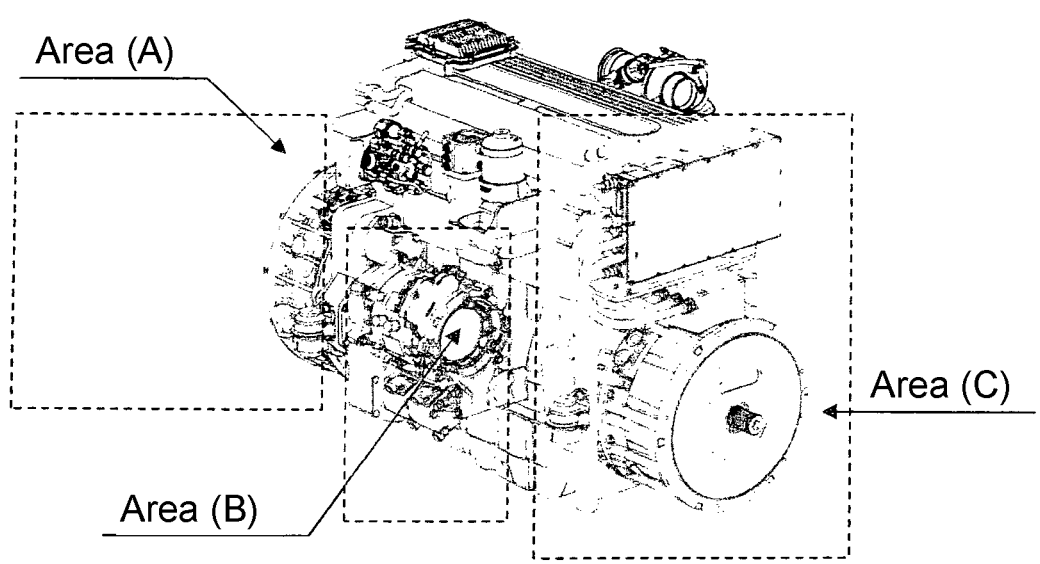
FIG. 3 shows the individual installation space areas.

The engine from FIG. 1 and FIG. 2 is illustrated in FIG. 3, divided into three areas A, B and C, area A representing the one front face and area C representing the other front face of the engine or internal combustion engine. Area B essentially includes the service side area of the internal combustion engine around electric motor 8.

The arrangement of diesel high pressure pump 3, which is connected essentially without cables to common rail 21, is illustrated in FIG. 4.

The opened cylinder head rests on crankcase 4 and shows cable harness 22, which is situated below cylinder head cover 23. Below cylinder head cover 23, injectors 25 project into the cylinder head to supply the internal combustion engine with fuel, the injectors being supplied with fuel by common rail 21.

LIST OF REFERENCE NUMERALS 1 control unit
2 cylinder head
3 diesel high pressure pump
4 crankcase
5 filter module
6 power takeoff (PTO)
7 adapter transmission
8 electric motor
9 supporting bracket
10 oil pan
11 exhaust gas line and exhaust gas turbocharger (EGT)
12 electric motor
13 SAE adapter unit
14 EGR module
15 high voltage converter
16 electric motor/starter
17 engine oil cooler
18 front plate
19 adapter unit
20 electric motor
21 common rail
22 cable harness
23 cylinder head cover
24 hydraulic pump
25 injector

What is claimed is:

1. An internal combustion engine comprising:
   a crankcase;
   a first electric motor situated on the crankcase;
   at least one control unit for controlling at least one of the internal combustion engine and the electric motor; and
   at least one high voltage converter mounted on top of a front plate, the front plate being connected to a front face of the crankcase, the first electric motor being attached to the front plate by an adaptor unit fixed to the front plate.

2. The internal combustion engine as recited in claim 1 wherein the first electric motor is configured as a generator.

3. The internal combustion engine as recited in claim 1 further comprising a cylinder head cover and a common rail situated in the cylinder head cover.

4. The internal combustion engine as recited in claim 1 further comprising a cylinder head cover and a cable harness is situated in the cylinder head cover.

5. The internal combustion engine as recited in claim 4 wherein the control unit is configured for connecting to the cable harness.

6. The internal combustion engine as recited in claim 1 further comprising a cylinder head cover, the control unit being situated on or at the cylinder head cover.

7. The internal combustion engine as recited in claim 1 further comprising a second electric motor on an exhaust gas side of the crankcase.

8. The internal combustion engine as recited in claim 7 further comprising a third electric motor on a service side of the crankcase, the service side being opposite of the exhaust gas side.

9. The internal combustion engine as recited in claim 8 further comprising a fourth electric motor on the exhaust gas side of the crankcase.

10. The internal combustion engine as recited in claim 1 wherein the high voltage converter is connected to the first electric motor by cables, the electric motor being below the high voltage converter.

11. An internal combustion engine comprising:
    a crankcase;
    a first electric motor situated on a front face of the crankcase, the first electric motor being configured as a generator;
    a second electric motor situated on an exhaust gas side of the crankcase, the second electric motor being configured as a starter;
    at least one control unit for controlling at least one of the internal combustion engine and the electric motor;
    at least one high voltage converter; and
    an exhaust gas turbocharger positioned above the second electric motor on the exhaust gas side of the crankcase.

12. The internal combustion engine as recited in claim 11 further comprising an engine oil cooler situated on the exhaust gas side of the crankcase approximately at a height of and spatially behind the second electric motor.

13. The internal combustion engine as recited in claim 12 further comprising an exhaust gas recirculation module situated on the exhaust gas side of the crankcase above the engine oil cooler.

14. The internal combustion engine as recited in claim 11 further comprising a cylinder head and a high-pressure pump situated on a side of the cylinder head.

15. The internal combustion engine as recited in claim 11 wherein the high-pressure pump situated on a service side of the cylinder head, the service side being opposite the exhaust gas side on the internal combustion engine.

16. The internal combustion engine as recited in claim 15 further comprising a cylinder head cover and a common rail situated in the cylinder head cover, the high-pressure pump being configured for connecting without cables to the common rail.

17. An internal combustion engine comprising:
    a crankcase;
    an electric motor mounted by a supporting bracket on a service side of the crankcase;
    at least one control unit for controlling at least one of the internal combustion engine and the electric motor;
    at least one high voltage converter;
    a hydraulic pump situated below the electric motor on the service side of the crankcase, the supporting bracket abutting the hydraulic pump.

18. The internal combustion engine as recited in claim 17 further comprising an adaptive transmission, the hydraulic pump and the electric motor being situated on the adaptive transmission.

19. The internal combustion engine as recited in claim 17 further comprising a diesel high-pressure pump for suppling fuel to fuel injectors and a power takeoff situated below the diesel high-pressure pump on the service side of the crankcase.

20. The internal combustion engine as recited in claim 19 further comprising an adapter transmission situated below the power takeoff on the service side of the crankcase.

* * * * *